United States Patent [19]

Perry et al.

[11] Patent Number: 4,962,904
[45] Date of Patent: Oct. 16, 1990

[54] TRANSITION FITTING FOR HIGH STRENGTH COMPOSITE

[75] Inventors: John S. Perry; Harold A. Stowe, both of Seattle, Wash.

[73] Assignee: The Boeing Company, Seattle, Wash.

[21] Appl. No.: 618,566

[22] Filed: Jun. 7, 1984

[51] Int. Cl.⁵ ............................................. B64C 1/06
[52] U.S. Cl. ................................... 244/131; 244/123; 244/132; 244/133
[58] Field of Search ............... 244/123, 127, 130, 131, 244/132

[56] References Cited

U.S. PATENT DOCUMENTS

| | | | |
|---|---|---|---|
| 3,328,229 | 6/1967 | Windecker | 244/127 X |
| 4,113,910 | 9/1978 | Loyd | 244/131 X |
| 4,213,587 | 7/1980 | Roeseler et al. | 244/11 X |
| 4,253,378 | 3/1981 | Donovan | 89/142 X |
| 4,390,153 | 6/1983 | Wuermseer | 244/13 |
| 4,411,940 | 10/1983 | Derkacs et al. | 244/123 X |
| 4,448,372 | 5/1984 | Larson | 244/131 X |

FOREIGN PATENT DOCUMENTS 2074117 10/1981 United Kingdom ................ 244/131

Primary Examiner—Peter A. Nelson
Attorney, Agent, or Firm—J. Michael Neary

[57] ABSTRACT

A transition fitting (16) for a high strength composite article (10) comprised of a matrixed skin (12) supported by and bonded to a core (14) to locate the same in an intended structural disposition subjecting the composite and fitting at or about a juncture thereof to bending and/or shear loads, comprising a profiled web (22) disposed within the composite article and a shank for fixturing the article, wherein the web includes a longitudinal aspect projecting into the core from the juncture to a tip of the web (26), a lateral aspect projecting across the core bounding the juncture, and a transverse aspect extending through the core; wherein the transverse aspect of the web tapers inwardly along the longitudinal direction of the web toward the tip and is dimensioned to provide load distribution to transfer structural loads from the composite to the fitting along a longitudinal force gradient having a minimum force value at the tip and a maximum force value at the shank, and yet further wherein the lateral aspect is dimensioned to yield a web surface area selected to provide force balancing for maintaining loads transferred to the web along the gradient below the interfacial shear limits at the junctures of the fitting, the core and the skin.

14 Claims, 2 Drawing Sheets

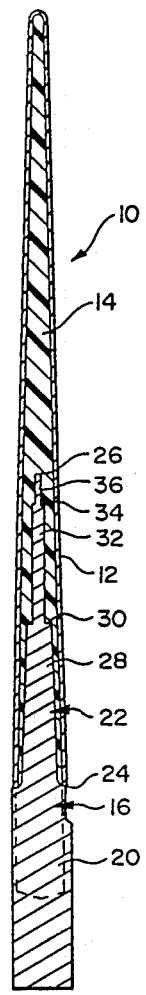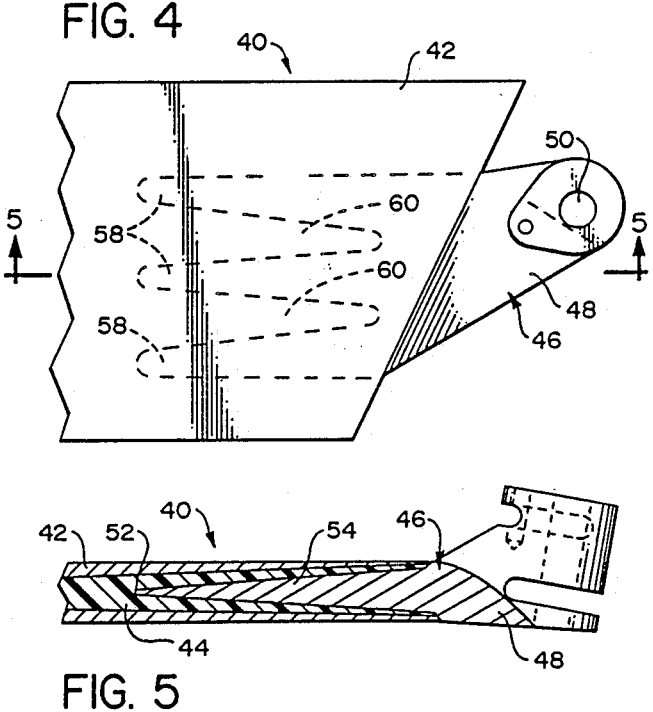

TRANSITION FITTING FOR HIGH STRENGTH COMPOSITE

TECHNICAL FIELD

The present invention relates to a transition fitting for a high strength composite article, configured to position the same in an intended structural configuration; and, more especially, to such a fitting for dynamic manipulation of a composite airfoil. The transition fitting of the present invention is widely adaptable for fixturing composite articles which include an outer skin tailored as to thickness and directional layup and having a shape-defining core, wherein the design requires the transfer of concentrated loads out of the composite to a supporting structure. A particularly intended environment for a transition fitting in accordance with the present invention is the disposition of same in concert with a control surface or other airfoil member such as a wing or elevon of an aircraft or missile, fabricated from a composite skin disposed over and in association with a syntactic foam core, wherein a transition fitting positions that airfoil over an intended range of aerodynamic configurations during flight; and which, in pursuit of that endeavor, must take concentrated loads from the composite airfoil to the primary structure of the craft or missile. Other utilities, including such diverse environments as vehicle cargo doors or the like, are equally well within the technical field of the present invention, as will become apparent as this description proceeds.

DESCRIPTION OF THE BACKGROUND ART

Composite materials enjoy widespread acceptance, with increasing popularity, as structural materials in many engineering designs. Offering the designer a high strength-to-weight ratio, good stiffness and modulus characteristics, and typically an environmentally benign electrochemical activity, composites are now replacing many structural alloys in a broad spectrum of engineering applications. The transportation arts are notable in the integration of composite structures in several significant ways, including ground vehicles but with heavier emphasis on aerospace applications. For example, aircraft and missiles have now seen considerable incorporation of nonmetallic composite members through out these airborne vehicles.

Where the designer employs a composite as a structural element, the fixturing of same has posed some problems. If one intends to use a composite structure, for example, as a flooring or bulkhead member there are various fixturing techniques which may be employed. Usually, in those situations, one is concerned with a transverse compressive force across the composite structure, including any shape-defining core member, such that the loads imposed tend to avoid forces having substantial shearing components.

On the other hand, the full utility of composite members has yet to be realized where a structural or load-bearing element must be fixtured in such a way as to induce shear forces or bending moments as respects the fiber orientation of the composite. One environment, and indeed the most preferred for purposes of the present invention (where full integration of composite structures has historically been limited), is that involved in respect of airfoil components of an aircraft or missile. These would include, for example, an elevon, wing, fin, or like primary airfoil surface which is subjected to substantial force and which, within that environment, must be reliably manipulated to various positions or configurations to serve its intended purpose. Fixturing such a control surface for that purpose has proved to be problematic at best. The desirability of using composite structures with the advantages offered by high stiffness and strength-to-weight ratios, coupled with an ability to withstand the wide range of service temperatures and severe environments involved, has been at least partially offset by a difficulty in fixturing those airfoils.

One approach to the resolution of that problem within that specific environment has been the incorporation of doublers to improve structural integrity of the airfoil within the root region. For example, a current missile design includes an elevon having a composite graphite/epoxy skin bonded to a chopped fiber molding compound core to define the airfoil structure. During the fabrication of that elevon, a titanium doubler is disposed proximate each skin/core interface along with an appropriate molding agent. The elements are subjected to a high pressure pressing operation in order to unify the disparate members into a structurally integral component. Fixturing is then achieved by discrete fasteners disposed transversely through the root with the doublers serving for structural load transfer along the fixturing line. Quite clearly, that is a cumbersome design but one which is found to be an acceptable tradeoff where the designer wishes to merge the advantages of composite structure within such a craft. To date, that has been a limiting tradeoff not only respecting airfoil surfaces but the broader incorporation of structural composites within many other engineering endeavors.

With an appreciation for the problems associated with the transfer of shear and/or bending moments from a composite to a supporting structure, the patent art generally follows along the lines of adapting composites to those situations and indeed relegating them only to those situations where force transmission is by and large in a compressive nature. For example, U.S. Pat. No. 4,252,378 discloses a wheel laminate having a syntactic foam core, specifically designed to serve as an automotive wheel for a pneumatic tire. The approach disclosed there involves the use of two metallic rim and disc halves along with a syntactic foam core of a toughened thermoset material to provide a sandwich wheel structure for dampening noise and vibration transmitted from the road to the vehicle on which the wheel is employed. The use of integral rim and disc halves is said to provide wheels which may be more economically formed as, for example, by stamping. The foam core is disclosed to seal the seam weld while the same core material locates and retains the bolt hole spacer ring between the disc portions for the asserted purpose of contributing to the load carrying capability of the structure and economy of assembly. In a particularly preferred disclosed embodiment in that reference, the laminated structure is comprised of spaced shells of thin steel, rigid plastic or a combination thereof, wherein the space intermediate the shells is filled with a syntactic foam based on matrix materials such as polyester or epoxy foam. That foam is poured or injected into the shell cavity or may be preformed and adhesively sandwiched therein prior to curing. The reference discloses metal skins, as opposed to composite skins, and goes on to speak of the molded fiber reinforced plastic in a manner suggesting the use of chopped fiber molding compound or injection molded skins. The metal fitting is disposed in a central position with respect to the overall assembly and, consistent with normal wheel design, does not project from one end wherein bending moments or like shear forces would obtain, the latter a more critical design problem as respects the intended environment of the present invention. Other references within the patent art appear similarly restricted in use, among which may be mentioned U.S. Pat. No. 3,707,434 (dealing with a sandwich panel having a syntactic core, but without disclosure of a metal fitting); U.S. Pat. No. 3,968,996 (another wheel design incorporating soft polyurethane foam as a sandwich core, and again without a separate metal fitting); U.S. Pat. No. 3,996,654 (dealing with the molding of syntactic foam flotation models, without discussion of a metal load fitting); U.S. Pat. No. 4,000,926 (pertaining to a wheel with steel faces joined by foam, otherwise not specified as syntactic); U.S. Pat. Nos. 4,013,810 and 4,034,137 (generally describing fabrication of a sandwich structure); U.S. Pat. Nos. 4,035,028 and 4,153,657 (dealing with wheel designs which employ metal face elements and soft polyurethane foam cores); U.S. Pat. No. 4,250,136 (referring to methods for fabricating composite structures, but otherwise silent respecting ancillary metal fittings); U.S. Pat. No. 4,292,368 (pertaining generally to the use of foams to rigidize a flattened end of a tubular rod); and U.S. Pat. No. 4,401,715 (another disclosure within this ambit, but again failing to disclose or suggest separate metal fittings).

From the brief discussion of the art as aforesaid, one will quickly appreciate that composite structures including foam cores for shape definition and load distribution have seen very limited structural utility because of the pervasive problem of transferring shear and/or bending loads outwardly at one end of the device. While those designers involved, for example, in the aerospace arts would dearly love to incorporate composite structures more broadly throughout aircraft and/or missiles, the limitation on fixturing these articles in such a way as to avoid separation at the root had made this heretofore an elusive task.

BRIEF DESCRIPTION OF THE INVENTION

The present invention advantageously provides a transition fitting specifically configured to secure a composite structural member and to support the same against shear and/or bending moments, transferring those concentrated loads from the composite to the supporting structure without separation and/or delamination at the root region or base of the composite. The transition fitting and resultant assembly in accordance with the present invention avoids the incorporation of ancillary fixture means within the root region and, by virtue of an elegant simplicity of design, materially reduces fabrication complexity and costs The transition fitting of the present invention permits the designer to tailor force or load distribution from the composite to the supporting structure over a desirable gradient whereby localized stresses are maintained below the shear limit extant at the interfaces between the fitting and core and that between the core and skin of the assembly. The transition fitting of the present invention is highly desirable for use in securing and manipulating an airfoil, but the advantages are equally well adapted to the structural support of a wide variety of composite devices and especially advantageous where loads are not substantially exclusively compression loads on the composite structure.

The foregoing, and other, advantages of the present invention are realized in one aspect thereof by means of a transition fitting for a high strength composite article to position the same in an intended structural configuration, wherein that composite includes a tailored matrixed skin separated by and bonded to a core, which fitting comprises a profiled web having a longitudinal aspect projecting into the core from a shank of the fitting disposed proximate the root region of the article to a tip lying within the core, a lateral aspect projecting across the root region within the core, and a transverse aspect extending through the core; wherein the transverse dimension of the fitting tapers along the longitudinal direction inwardly toward the tip to provide load distribution means transferring structural loads from the composite to the fitting along a gradient having a minimum force value at the tip and a maximum force value at the shank, and further wherein the lateral aspect extends within the core in a dimension to provide a sufficient surface area for the web to define force balancing means for maintaining load distribution transferred to the fitting along the gradient below the shear limit at the interfaces between the web and the core and the skin and the core. The fitting is one wherein the web and shank are chosen from metallic compositions which are electrochemically benign respecting the composition of the composite; in a most preferred embodiment, a titanium fitting for use in concert with a graphite/epoxy airfoil with a syntactic foam core of an epoxy resin filled with microspheres.

The fitting may have a generally uniform taper or a generally stepped taper in order to tailor its flexure characteristics in a desired manner for matching its load bearing capabilities with the forces transferred from the tailored composite skin through the foam. Further along those lines, stiffness and modulus of the overall assembly may be tailored in much the same fashion. Geometric variations as respects the planar shape or configuration of the web are myriad in order to balance the forces transmitted through the mediating foam.

The transition fitting of the present invention may be fabricated in any of several convenient ways. Preimpregnated composite skins may be laid up in matching half molds by conventional vacuum bag techniques. Following a trimming procedure along the skin edges, the skin halves are returned to the mold which is closed with the metal fitting in place, whereupon syntactic foam is injected under pressure and heat to fill the internal cavity thereby defined. Following a cure, the completed assembly is removed from the mold. Alternatively, a silicone rubber faced internal mandrel may be employed to support preimpregnated composite skins by wrapping the same thereabout. The wrapped mandrel is then placed in a two-half airfoil mold which is closed and the composite skin cured. The composite part then receives the metal fitting, whereupon syntactic foam is injected into the cavity and allowed to cure. A further alternative, and a procedure deemed to be the most preferred in accordance with the present invention, casts the metal fitting and shaped internal syntactic foam core together in a mold to cure the same into one piece. Dry composite fiber/fabric of a proper thickness is wrapped about the core and the combination placed into a two-piece airfoil mold. The mold is closed and liquid resin injected, which infiltrates the dry fabric and thence cures. Following the cure, a completed assembly is removed.

Other advantages of the present invention, and a fuller appreciation of its construction and mode of operation, will become apparent from a review of the following detailed description of preferred embodiments, taken in conjunction with the figures of drawing.

BRIEF DESCRIPTION OF THE DRAWINGS

FIG. 2 is a sectional view taken along the line 2—2 of FIG. 1;

FIG. 3 is a generally longitudinal sectional view taken along the line 3—3 of FIG. 1;

FIG. 4 is an alternate embodiment of a transition fitting in accordance with the present invention, here showing the same in association with a composite wing structure disposed at the root region thereof and once again secured for manipulating the airfoil in such a manner that bending and shear stresses are implied at the joint region; and, FIG. 5 is a sectional view taken substantially along the line 5—5 of FIG. 4.

DETAILED DESCRIPTION OF THE INVENTION

Figure 1:
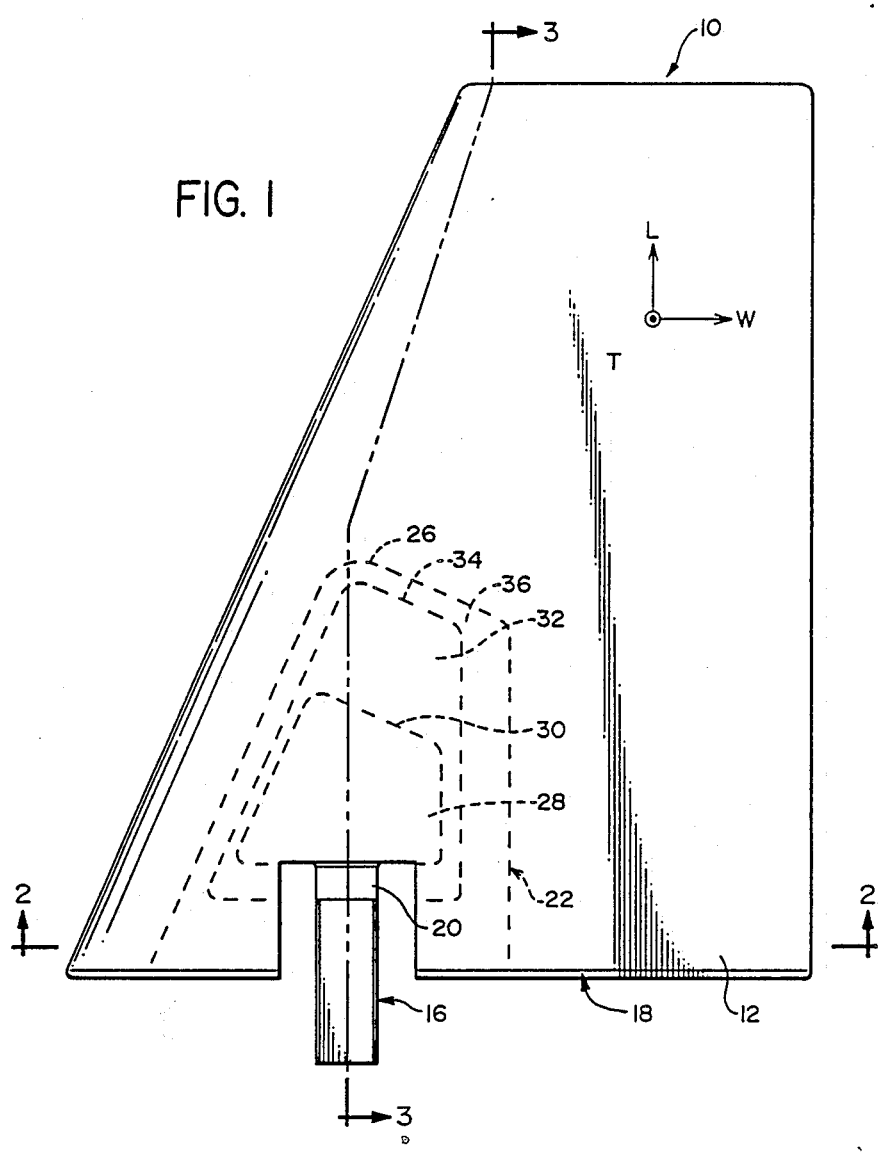
FIG. 1 is a top plan view of an elevon incorporating a metal transition fitting in accordance with the present invention to secure the elevon to the primary structure of, for example, a missile, the fitting being shown for supporting and manipulating the elevon from one side or edge location thereof implying the development of bending and shear stresses at or about that joint region.

The present invention relates to a transition fitting for a high strength composite article, configured to position the same in an intended structural disposition and, more especially, to such a fitting for dynamic manipulation of a composite airfoil. The transition fitting of the present invention is widely adaptable for fixturing composite articles which include an outer skin typically comprised of a tailored matrixed fibrous network and having a shape defining core, wherein the design requires the transmission of concentrated loads out of the composite to a supporting structure. Generally, those loads are developed and/or resolved in such a way that bending and/or shear forces are experienced. A particularly interesting intended environment for a transition fitting in accordance with the present invention is the association of same with a control surface or other airfoil member such as a wing or elevon of an aircraft or missile, fabricated from a composite skin disposed over and in association with a syntactic foam core, wherein the transition fitting positions that airfoil over a range of aerodynamic configurations during flight and which, in pursuit of the endeavor, must take concentrated loads from the composite airfoil to the superstructure of the craft or missile. Accordingly, the invention will now be described with reference to certain preferred embodiments within the aforementioned contexts; albeit, those skilled in the art will appreciate that such a description is meant to be exemplary and not limitative.

The composites of interest, broadly speaking, are those which include a matrixed fibrous array of generally continuous fibers set within a cured polymeric substrate, bonded to, separated by, or otherwise supported on a core which provides gross geometric definition for the overall article. Looking more specifically to the particular articles of interest, airfoils for aircraft or missiles, a representative composite is a graphite/epoxy composite shell enveloping a syntactic foam core of an epoxy resin. Other composites of interest include polyimide or polyester resin matrices and/or Kevlar, fiberglass or ceramic-fiber reinforcements, depending upon the strength and stiffness design requirements service temperatures and also the range of processing temperatures required for the fabrication of the finished part. With those factors considered, materials selection can be of paramount concern, especially considering the electrochemical activity of, for example, graphite composites when associated with such materials as steel or aluminum, with the potential for corrosion and/or pitting problems perhaps contributing to a source of failure. Hence, engineering alloys of titanium or the like having a benign electrochemical activity as respects those composite materials will more preferably be utilized for such purposes. Inasmuch as the fitting of the present invention is, as set forth above, destined to transfer loads out of the composite structure along a path whereby bending and/or shear are significant force components, physical matching of modulus and stiffness are likewise of critical concern to the designer. The interfacial stresses which are anticipated at the junctures of the fitting, the syntactic foam core, and the composite skin must be taken into account lest the composite delaminate from the foam substrate or the fitting pull out of the latter due to force application in excess of the shear limits and/or peeling stresses which can be tolerated. Thus, flexure must be accommodated, but in a controlled manner as respects the three very different materials constituting the overall structural assembly of interest. The present invention achieves those goals and in a manner which simplifies design, as will become apparent from the ensuing discussion.

Turning to the figures of drawing, in each of which like parts are identified with like reference numerals, FIGS. 1–3 illustrate an elevon designated generally as 10 which is generally representative of that type of airfoil surface utilized in a missile. The elevon has a generally trapezoidal planar projection defined by a shell 12 of a tailored composite skin separated by and supported on a syntactic foam core 14 to define an airfoil as best envisioned with reference to, for example, FIG. 2. The airfoil or elevon 10 is supported by a fitting designated generally as 16 for manipulation of this control surface during flight, transmitting the aerodynamic forces imposed upon the elevon outwardly therefrom at a base or root region thereof designated generally as 18. Because of the disposition of the fitting 16 as viewed, for example, in FIG. 1, deflection of the airfoil 10 during dynamic flight conditions contributes to and develops bending moments which are resolved within the composite and fitting and transferred outwardly of the former through the latter. For the sake of descriptive convenience in conveying these thoughts, one may best view the assembly to be operating in an orthogonal coordinate system having a longitudinal axis "L" lying in the length direction of the airfoil, a lateral axis "W" lying along the width dimension of the airfoil, and a transverse axis "T" extending through the airfoil in a thickness direction, as generally represented in FIG. 1.

Turning more specifically to the fitting 16 of the present invention, the same is generally constituted of a shank 20 extending outwardly of the composite and a web 22 projecting within it. In this case, the web 22 is a profiled web specifically configured to accommodate the loads anticipated on the airfoil 10 while matching the stiffness, strength, and modulus of the fitting to the overall composite structure. As best viewed in FIG. 3, the tailored composite skin 12 which surrounds the foam 14 merges to the fitting 16 along a line or juncture 24 which separates the web 22 from the shank 20. At that same juncture the foam core 14 has tapered or merged to a terminus as well, generally leaving the composite in direct contact with the fitting and without the force mediation of the intermediate foam layer as is provided along the longitudinal direction of the airfoil 10 within the body of the article. The web 22 terminates at its other or distal end in a tip 26. Over this span of the web 22 there is thus provided a longitudinal aspect extending from the juncture 24 to the tip 26 projecting longitudinally into the foam core along the axis "L". As is evident from FIG. 3, this web is profiled over that longitudinal aspect, tapering inwardly toward the tip in contradistinction to the opposed taper of the foam region. Thus, inasmuch as the foam core mediates force distribution from the composite skin to the fitting, this longitudinal aspect of the fitting 16, or more particularly the web 22, provides load distribution means for transferring structural loads from the composite to the fitting along a force gradient having a minimum force value at the tip 26 and a maximum force value at the shank region defined by or at about the juncture 24. Consequently, whereas the entirety of the load imposed upon the composite airfoil 10 is resolved within the mediating foam core at longitudinal stations outwardly disposed along the "L" axis beyond the tip 26, the entirety of the force is borne upon the shank of the fitting 16 inwardly of the junction 24; whereas the reversely tapered orientation of the web 22 vis-a-vis that mediating foam core 14 provides a tailored distribution of those forces over a force gradient along the length of the web.

In the preferred form shown in FIG. 3, the web 22 is profiled by way of a series of steps; a first reduced thickness web segment 28 extending from the shank and then merging at a step 30 to a second reduced thickness web segment 32, itself merging at a step 34 to terminal web segment 36 of yet thinner profile. The designer may tailor the exact shape of the gradient of force distribution transferred to the web 22 by a combination of material selection, skin tailoring and the geometry of these web segments both in terms of thickness and extent as well as the pattern employed. In the particular case exemplified here, it is desired to transmit force along a generally linear gradient (albeit, some deviation being tolerable) due to the design considerations imposed on the dynamic attributes of this airfoil. However, under other circumstances, the designer could well wish to establish a fairly clear departure from linearity in the manner in which force is loaded through the fitting to the supporting superstructure or other dependent member. Thus, in this case, with a minimum force value at the tip 26 and the entirety of the force transferred at juncture 24, one may easily plot the desired gradient and, within the realm of ordinary design skills, prescribe the profile or web 22 to achieve the desired results.

All other things being equal, the transfer of force from the airfoil 10 through the fitting 16 to the craft primary structure is conveniently tailored in the manner aforesaid. However, the three very disparate materials constituting the overall assembly can vastly complicate the ease of that task. There are very well defined interfacial shear limits existing at the laminar junctures of the skin 12, core 14, and fitting 16. Exceeding the shear limits will result in one or more types of failure including, for example, peeling of the components or pull-out of the fitting. Accordingly, provisions are made for a balancing of those forces as well. This achieved in accordance with a related aspect of the invention by a similar tailoring of the lateral aspect of the web 16 as best envisioned by comparison of FIGS. 1 and 2. Looking to this lateral aspect of the web, the individual web segments possess a broader profile along the lateral axis "W" as the web merges or tapers along the longitudinal axis "L" in the respective aspect. In other words, at the thinnest transverse aspect as occurs in the segment 36 proximate the tip 26, the web is the broadest in its lateral aspect. Likewise, the intermediate web segment 32 possesses an intermediate lateral aspect whereas the stockier base 28 projects the least in this lateral direction. In combination, the lateral and longitudinal aspects yield a surface area for the web 22 which jointly provides force balancing means for maintaining the load distribution transferred to the fitting along the gradient below the interfacial shear limits at the junctures of the fitting, the core and the skin.

As respects the specific embodiment of FIGS. 1-3, the fitting 16 is selected from a material having good compatibility with the composite with an eye toward accommodating strength, modulus, thermal expansion and corrosion tendencies. Inasmuch as the material of choice for elevon 10 is a graphite/epoxy composite, the most suitable candidate to meet the aforementioned requirements for the fitting 16 is titanium. The shape as illustrated in these figures insures a transference of both shear and moment from the composite to the metal fitting in a gradual manner, while the detail design of both the metal fitting and composite structure in the transition area insures that the strain at any point in either material stays within the allowable limits. A relatively low modulus material, but one having adequate strength in tension, shear, compression and adhesion, is used as the load transfer medium or load mediator, between the composite and the metal fitting. In this exemplary embodiment, dealing with a control surface for a missile, syntactic foam of an epoxy resin having hollow glass microballoons is the most preferred load transfer medium., a material having a charge of microballoons to yield a density of about 45 pounds per cubic foot (0.026 pounds per cubic inch), a modulus of about 270,000 psi, and shear and tensile strengths of approximately 1,200 psi being most preferred. The resulting elevon was tested to compare it with an existing elevon of a similar composite structure, which incorporated titanium doublers and fasteners passing through the root area. Strength and stiffness were maintained, indeed improved upon in some ways, while dynamic performance was found to be outstanding on a qualitative basis. Thus, all of the benefits of previous approaches were retained, if not exceeded, while the layup of the overall elevon structure was materially simplified by virtue of the more straightforward design employed.

FIGS. 4 and 5 illustrate an alternate embodiment to show the range of adaptability of the principles in accordance with the present invention. Once again an airfoil is shown, but in this instance a wing identified generally as 40. The wing is a composite of graphite and epoxy, comprised of a composite skin 42 separated and supported by a syntactic foam core 44. A metal transition fitting identified generally as 46, in this case a hinge fitting, is disposed in cooperative engagement with the wing 40 in order to fixture the same to an aircraft. For that purpose, the shank of the fitting 46, identified generally as 48, includes a bore 50 for receiving a fastener (not shown). The fitting 46 merges to a tip 52; once again, with a longitudinal profile in a web 54 tapering toward the tip 5 while the load-mediating foam likewise tapers in a reverse sense. Thus, as was the experience with respect to the embodiment of FIG. 1-3, a minimum force is applied at the tip 52 while the entire load is experienced at the shank 48 within the root region. A gradient is therefore established along the central web 54 as was the case discussed above. In this instance, however, a generally uniform taper is imparted to the web 54 as opposed to the stepped profile or taper of the web 22 in the previous embodiment. Likewise, the lateral profile of the fitting 46 differs. In this instance, it is constituted of a plurality of finger-like elements 58 which project along the longitudinal direction or constitute the longitudinal aspect; here the web projecting into the foam core leaving intermediate regions 60 intact along the now discontinuous lateral aspect. This approach adopts a somewhat different design for the purpose of balancing the bending forces or moments transferred to the fitting in order to accommodate the interfacial shear limits which accompany that force transfer. Otherwise, the embodiment of FIGS. 4 and 5 is comparable in function and principle to that of the embodiment illustrated and described in respect of FIG. 1-3.

The overall lateral and longitudinal geometries of the metal web comprising the transition fitting of the present invention can vary rather widely as those skilled in the art will now appreciate from the foregoing description. The principles to be borne in mind are basically twofold, those involving the manner in which force is transmitted along the gradient but with due regard for pullout resistance and the peeling stress of the composite. The former, force transference in a longitudinal direction, is controlled or tailored by the web profile in the longitudinal direction or aspect of the web, whereas the latter is accommodated by the lateral aspect or geometry inasmuch as that balances the localized shearing forces to be anticipated and resolved. Armed with these principles and an appreciation for the design of composite structures, those skilled in the art will have no difficulty in extending the concepts noted above to a wide variety of other structures (recognizing that the skill of those involved in design of composites and fittings therefor will allow for matching of stiffness, strength and the like).

The designer is also provided with the further benefit of simplicity in the fabrication of these devices. Very briefly stated, there are three preferred techniques. Preimpregnated composite skins may be laid up in matching half molds by conventional vacuum bag techniques. Following a trimming procedure along the skin edges, the skin halves are returned to the mold which is closed with the metal fitting in place, whereupon syntactic foam is injected under pressure and heat to fill the internal cavity thereby defined. Following a cure, the completed assembly is removed from the mold. Alternatively, a silicone rubber faced internal mandrel may be employed to support preimpregnated composite skins by wrapping the same thereabout. The wrapped mandrel is then placed in a two-half airfoil mold which is closed and the composite skin cured. The one-piece composite part then receives the metal fitting, whereupon syntactic foam is injected into the cavity and allowed to cure. A further alternative, and a procedure deemed to be the most preferred in accordance with the present invention, casts the metal fitting and shaped internal syntactic foam core together in a mold to cure the same into one piece. Dry composite fiber/fabric of a proper thickness is wrapped about the core and the combination placed into a two-piece airfoil mold. The mold is closed and liquid resin injected, which infiltrates the dry fabric and thence cures. Following the cure a completed one-piece assembly is removed.

From the foregoing description it is now evident that the present invention offers the advantages summarized hereinbefore. But while the invention has been described with reference to those advantages and in terms of certain preferred embodiments thereof, those skilled in the art will apppreciate that various substitutions, changes, modifications and omissions may be made without departing from the spirit thereof. Accordingly, it is intended that the preceding description of preferred embodiments not be deemed limitative of the scope of the present invention.

We claim:

1. A transition fitting for a high strength composite article, comprised of a matrixed tailored skin support by and bonded to a core, to locate the same in an intended structural disposition subjecting the composite and fitting at or about a juncture thereof to bending and/or shear loads, said fitting comprising a profiled web disposed within said composite article and a shank for fixturing said article, said web including a longitudinal aspect projecting into said core from said juncture to a tip of said web, a lateral aspect projecting across said core bounding said juncture and a transverse aspect extending through said core; wherein said transverse aspect of said web tapers inwardly along the longitudinal direction of said web toward said tip and is dimensioned to provide load distribution means for transferring structural loads from said composite to said fitting along a longitudinal force gradient having a minimum force value at said tip and a maximum force value at said shank, and further wherein said lateral aspect is dimensioned to yield a web surface area selected to provide force balancing means for maintaining loads transferred to said web along said gradient below the interfacial shear limits at the juncture of said fitting, said core and said skin.

2. The fitting of claim 1, wherein said web and shank are selected from metallic materials which are electrochemically benign respecting the composition of said composite.

3. The fitting of claim 2, wherein said taper of said web is a generally uniform taper.

4. The fitting of claim 2, wherein said taper of said web is a stepped taper.

5. The fitting of claim 2, wherein said article is an airfoil.

6. The fitting of claim 2, wherein said composite is a graphite/epoxy composite, said core is a syntactic foam core and said fitting is a titanium-based alloy fitting.

7. The fitting of claim 2, wherein the dimension of said web in said lateral aspect is inversely proportional to the dimension of said web in said transverse aspect.

8. The fitting of claim 2, wherein said web has a discontinuous lateral aspect comprised of a plurality of discrete elements projecting within said composite comprising said longitudinal aspect.

9. A composite airfoil assembly comprising a tailored skin of a matrixed fibrous array supported by and bonded to a core and a transition fitting disposed within the root region of said airfoil to locate the same relative to the superstructure of an aircraft, said fitting comprising a profiled web disposed within said airfoil including a longitudinal aspect projecting into said core from a juncture of said fitting to a tip of said web, a lateral aspect projecting across said core within said root region and a transverse aspect extending through said core; wherein said transverse aspect of said web tapers inwardly along the longitudinal direction of said web toward said tip and is dimensioned to provide load distribution means for transferring structural loads from said composite to said fitting along a longitudinal force gradient having a minimum force value at said tip and a maximum force value at said shank, and further wherein said lateral aspect is dimensioned to yield a web surface area selected to provide force balancing means for maintaining loads transferred to said web along said gradient below the interfacial shear limits at the juncture of said fitting, said core and said skin.

10. The airfoil of claim 9, wherein said taper of said web is a generally uniform taper.

11. The fitting of claim 9, wherein said taper of said web is a stepped taper.

12. The airfoil of claim 11, wherein the dimension of said lateral aspect within a stepped region is inversely proportional to the dimension of the transverse aspect thereof.

13. The airfoil of claim 9, wherein said skin is a graphite/epoxy composite tailored skin, said core is a syntactic foam core and said fitting is a titanium based alloy fitting.

14. The airfoil of claim 9, wherein said web includes a discontinuous lateral aspect comprised of a plurality of discrete elements projecting within said composite comprising said longitudinal aspect.

* * * * *